No. 870,616. PATENTED NOV. 12, 1907.
B. BRAZELLE.
OIL WELL APPLIANCE.
APPLICATION FILED DEC. 26, 1906.

Witnesses:
J. B. Megown.
Geo. H. Williams.

Inventor:
Benjamin Brazelle,
By Carruth & Dann
Attys

UNITED STATES PATENT OFFICE.

BENJAMIN BRAZELLE, OF KIRKWOOD, MISSOURI, ASSIGNOR TO A. LESCHEN & SONS ROPE COMPANY, OF ST. LOUIS, MISSOURI, A CORPORATION OF MISSOURI.

OIL-WELL APPLIANCE.

No. 870,616.   Specification of Letters Patent.   Patented Nov. 12, 1907.

Application filed December 26, 1906. Serial No. 349,480.

*To all whom it may concern:*

Be it known that I, BENJAMIN BRAZELLE, a citizen of the United States, and a resident of the city of Kirkwood, county of St. Louis, and State of Missouri, have invented a new and useful Improvement in Oil-Well Appliances, of which the following is a specification.

My invention relates to appliances used in connection with oil and water wells, and has for its principal objects, to render the use of wire rope practicable for pumping oil and water.

In the practical operation of oil and water wells, it becomes necessary, for the purposes of repair, to withdraw the pumping device from the well. For this purpose, it is the practice to wind the pump rope around one end of the bull shaft leaving the other end of the bull shaft free for use with another rope. This manner of using the bull shaft requires that the pump rope should be stripped of the appliances usually connected thereto; and heretofore it has been found impracticable to use a wire rope on account of the difficulties of stripping such appliances therefrom and of replacing them thereon. The present invention overcomes these difficulties.

Figure 1:
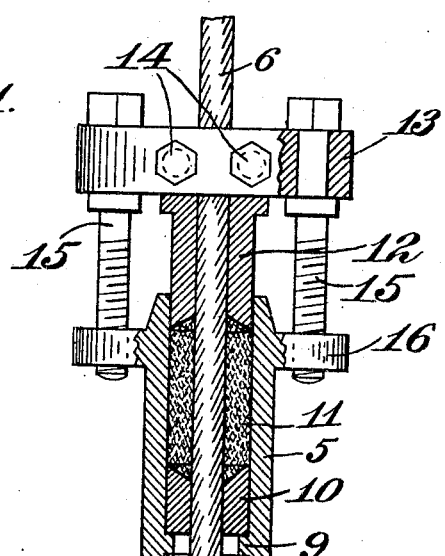
Figure 2:
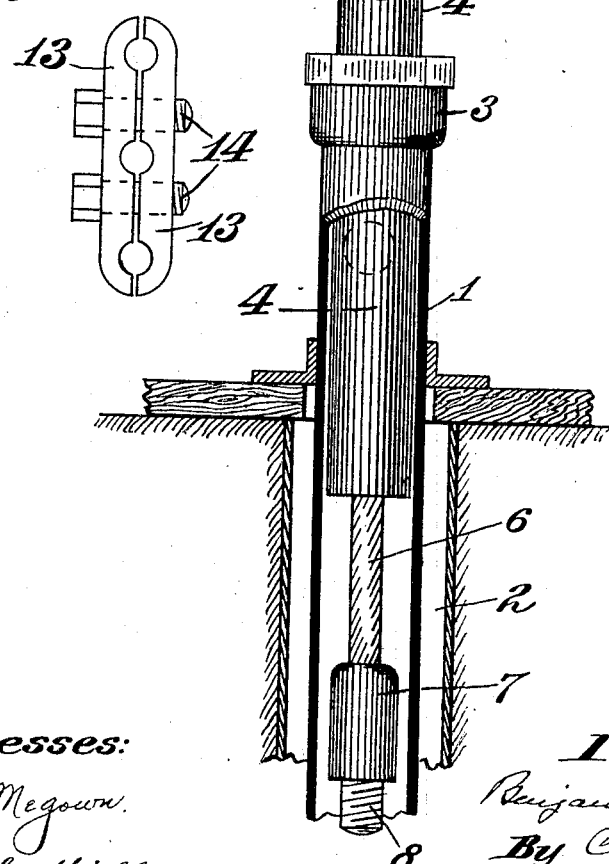

In the accompanying drawing, which forms part of this specification, and wherein like symbols refer to like parts wherever they occur, Figure 1 is a vertical view partly in section and partly in elevation of a portion of an oil well and of a portion of the pumping mechanism embodied in my invention; Fig. 2 is a detail plan view of a rope clamping device.

At the upper end of the well tubing 1 of an oil or water well 2 is a stuffing box 3 inside of which reciprocates a tubular piston rod 4. Screwed or otherwise fastened on to the top of this tubular piston rod is a tubular member 5 arranged to constitute a stuffing box for packing the wire well rope 6 which extends downwardly through said stuffing box and the tubular piston rod into the well tubing. At the end of this wire rope is a rope socket 7 which is provided with a screw 8 or otherwise fitted for the attachment of a piston or other appliance. The rope socket is of such size and shape as to pass freely through the tubular piston rod and through the stuffing box 5, the shoulder of the stuffing box being designed so as not to obstruct such movement. In the lower portion of the stuffing box is a shoulder 9 which constitutes a seat for a washer or packing gland 10. The space in said stuffing box above said washer and surrounding said wire rope is filled with suitable packing 11 which is compressed downwardly or endwise by means of a tubular packing gland or crowder 12 mounted on said rope and fitting in the upper end of said stuffing box. Immediately above said crowder is a clamping device consisting of two transverse members 13 located on opposite sides of the rope and provided with threaded bolts 14, whereby they are adapted to be clamped together upon said rope. The transverse members of the clamping device are provided with threaded bolts 15 extending therethrough parallel with the rope, and these threaded bolts 15 work in screw-threaded openings provided therefor in laterally arranged lugs or flanges 16 on the upper end of the stuffing box. By this arrangement, the turning of the longitudinal bolts causes a relative movement of the crowder and the stuffing box, which movement is usually effected before the clamping device is clamped to the rope.

The operation of my device is as follows: The packing members, namely, the glands or crowders, are first slipped onto the rope and then the rope socket is mounted on the end of said rope. This rope socket is then pushed through the stuffing box and the tubular piston rod, and the lower washer is seated against the shoulder of the stuffing box. The stuffing box is then provided with the proper packing and the upper crowder is inserted in the upper end of the stuffing box. Then the clamping device is mounted loosely on the rope and its longitudinal bolts are manipulated to adjust the upper crowder to the proper position and the clamping device is firmly clamped to the rope. The piston or other suitable appliance is then applied to the rope socket and then inserted together with the piston rod through the stuffing box at the upper end of the well tubing.

When it becomes desirable to make repairs, the rope is wound up on the bull shaft until the parts are withdrawn from the well tubing. The clamping device is then loosened and removed from the rope. The further movement of the bull shaft will cause the rope socket to be drawn through the tubular piston rod until it bears against the lower washer; and then it lifts the lower crowder, the packing and the upper crowder endwise through the stuffing box. The rope is thus stripped of all appliances except the two crowders and the rope socket, and these appliances are so small as to cause no interference with the use of the bull shaft in making repairs in the usual manner.

Obviously, my device admits of considerable modification within the scope of my invention, and therefore I do not wish to be limited to the specific construction shown and described.

What I claim as my invention and desire to secure by Letters Patent is:

1. The combination of a rope having a rope socket thereon, a stuffing box through which said rope extends, and detachable fastening devices arranged to fasten said stuffing box to said rope, the least diameter of said stuffing box being sufficient to permit the passage of said rope socket therethrough.

2. The combination with a rope having packing members and a rope socket, of a tubular stuffing box adapted to coöperate with said packing members, the bore of said stuffing box being sufficient to permit said rope socket to pass therethrough.

3. The combination with a rope having packing members and a rope socket, of a tubular stuffing box, through which said rope extends, said stuffing box having an internal shoulder constituting a seat for one of said members and the opening in said shoulder being sufficient to permit said rope socket to pass therethrough, and means for fastening said stuffing box to said rope.

4. The combination with a rope having packing members and a rope socket, of a tubular stuffing box through which said rope extends, said stuffing box having an internal shoulder constituting a seat for one of said members, and the opening in said shoulder being sufficient to permit said rope socket to pass therethrough, and means for fastening said stuffing box to said rope, said means comprising a device adapted to clamp said rope and adjustably connected to said stuffing box.

5. The combination with a tubular stuffing box having an internal shoulder, of a rope extending through said stuffing box, a rope socket on the end of said rope, a washer on said rope adapted to bear against said shoulder, a crowder arranged to coöperate with said washer, and means for detachably securing said stuffing box to said rope, said rope socket being larger than the bore of said washer but small enough to pass through said stuffing box, whereby the washer and crowder are removable from said stuffing box with said rope.

6. The combination of a rope having a rope socket, a tubular stuffing box through which said rope extends, means for detachably securing them together, said stuffing box having a shoulder for a packing washer and having a bore sufficient to permit the rope socket to pass endwise through it, a packing washer on said rope and arranged to coöperate with said shoulder, and a crowder arranged to coöperate with said washer.

7. The combination of a rope having a rope socket, a stuffing box through which said rope extends, and means for detachably securing said stuffing box to said rope, said stuffing box having a shoulder for a packing washer, a packing washer therein, and a crowder, said securing means comprising a device adapted to be clamped on the rope and longitudinal screw bolts connecting said clamping device and said stuffing box, the narrowest bore of said stuffing box being greater than the diameter of said rope socket, substantially as and for the purpose described.

8. The combination with an oil well of a tubular piston rod having a stuffing box, a rope extending through said stuffing box and having a rope socket, and means for fastening said rope to said stuffing box, said stuffing box having a shoulder for a packing washer, a packing washer therein and a crowder arranged to coöperate with each other, said fastening means comprising a device adapted to be clamped on the rope and longitudinal screw bolts connecting said clamping device and said stuffing box and said stuffing box being open at the upper end and having a bore through its shoulder of sufficient diameter to permit the rope socket to pass through it, substantially as and for the purpose described.

Signed at St. Louis, Missouri, this 18th day of December, 1906.

BENJAMIN BRAZELLE.

Witnesses:
 JAMES A. CARR,
 JULIA B. MEGOWN.